US008051094B2

(12) United States Patent
Agrawal et al.

(10) Patent No.: US 8,051,094 B2
(45) Date of Patent: *Nov. 1, 2011

(54) COMMON INTERFACE TO ACCESS CATALOG INFORMATION FROM HETEROGENEOUS DATABASES

(75) Inventors: Geetika Agrawal, San Jose, CA (US); Mary Ann Roth, San Jose, CA (US); Peter Martin Schwarz, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 445 days.

This patent is subject to a terminal disclaimer.

(21) Appl. No.: 12/249,957

(22) Filed: Oct. 12, 2008

(65) Prior Publication Data
US 2009/0037391 A1 Feb. 5, 2009

Related U.S. Application Data

(63) Continuation of application No. 11/131,792, filed on May 17, 2005, now Pat. No. 7,469,248.

(51) Int. Cl.
*G06F 7/00* (2006.01)
*G06F 17/30* (2006.01)
(52) U.S. Cl. ....................... 707/770; 709/203
(58) Field of Classification Search ........... 707/999.002, 707/999.01, 999.1, 999.103, 999.203, 707; 709/203
See application file for complete search history.

(56) References Cited

U.S. PATENT DOCUMENTS

| 5,596,744 | A | 1/1997 | Dao et al. |
| 5,721,911 | A | 2/1998 | Ha et al. |
| 6,240,416 | B1 | 5/2001 | Immon et al. |
| 6,275,820 | B1 * | 8/2001 | Navin-Chandra et al. ............ 1/1 |

(Continued)

FOREIGN PATENT DOCUMENTS
WO    02/35395 A    5/2002

OTHER PUBLICATIONS

"IBM VisualAge, DataAtlas Multiplatform, Dictionary User's Guide, Version 2," First Edition, Apr. 1997, pp. 1-6, 49-56, SC26-9039-00.

(Continued)

*Primary Examiner* — Khanh Pham
*Assistant Examiner* — Van Oberly
(74) *Attorney, Agent, or Firm* — Janet M. Skafar; Elissa Y. Wang

(57) ABSTRACT

Various embodiments of a system and computer program product to access metadata from a plurality of data servers from a federated database management system are provided. In one embodiment, a request for metadata, from a client application, is received by the federated database management system. Data servers which are accessible from the federated database management system are identified. For each data server, metadata describing data of a data source of that data server is retrieved in accordance with the application request. The retrieved metadata from each of the data servers is aggregated to produce an aggregated result in a uniform format. The aggregated result is provided. In another embodiment, for each data server, a source metadata request for metadata of that data server is generated in accordance with the application request and a source metadata application programming interface. A view is created based on the source metadata request for metadata for each data server.

26 Claims, 5 Drawing Sheets

U.S. PATENT DOCUMENTS

| | | | |
|---|---|---|---|
| 6,360,225 | B1 | 3/2002 | Kleewein et al. |
| 7,136,851 | B2 * | 11/2006 | Ma et al. .................... 707/770 |
| 7,249,135 | B2 | 7/2007 | Ma et al. |
| 7,469,248 | B2 | 12/2008 | Agrawal et al. |
| 2002/0198869 | A1 * | 12/2002 | Barnett .......................... 707/3 |
| 2003/0100999 | A1 | 5/2003 | Markowitz |
| 2003/0158767 | A1 | 8/2003 | Nwafor et al. |
| 2004/0148270 | A1 | 7/2004 | McKay et al. |

OTHER PUBLICATIONS

"Ascential, Meta Data Management, The Meta Data Glue," © 2004 Ascential Software Corporation, All information is as of Feb. 2004, pp. 1-4.

"Ascential Software, DataStage® Product Family, Architectural Overview," Jan. 2002, WP-3002-0102.

"Java.sql, Interface DatabaseMetaData, Java™ 2 Platform Std. Ed. v1.4.2," [online] Copyright 2003 Sun Microsystems, Inc.[retrieved on Jan. 25, 2005] Retrieved from the Internet: <URL: http://java.sun.com/j2se/1.4.2/docs/api/java/sql/DatabaseMetaData.html>.

"OBDC API Reference (Microsoft Open Database Connectivity (ODBC))," [online] © 1998-2004 Microsoft Corporation, [retrieved on Jan. 25, 2005]. Retrieved from the Internet: <URL: http://msdn.microsoft.com/library/en-us/odbc/htm/odbcodbc_api_reference.asp?frame=true>.

"IBM Software—DB2 Warehouse Manager for Linux, UNIX and Windows—Features and Benefits," [online] [retrieved on Jan. 25, 2005]. Retrieved from the Internet: < URL: http://www-306.ibm.com/software/data/db2/datawarehouse/about.html>. <4 pages>.

"DB2 Warehouse Manager—Data Warehousing Overview," [online] [retrieved on Jan. 25, 2005]. Retrieved from the Internet: <URL: http://www-306.ibm.com/software/data/db2/datawarehouse/overview.html>. <3 pages>.

IBM DB2 Warehouse Manager Standard Edition, Information Catalog Center Administration Guide, Version 8.2, [online] Copyright 1994, 2004 [retrieved on Jan. 25, 2005]. Retrieved from the Internet: <URL: ftp://ftp.software.ibm.com/ps/products/db2/info/vr82/pdf/en_US/db2die81.pdf>, SC-27-1125-01.

Saracco, C.M. et al, "Enabling distributed enterprise integration with WebSphere and DB2 Information Integrator", IBM Systems Journal, vol. 43, No. 2, 2004, pp. 255-269.

Haas, L.M. et al, "Data integration through database federation", IBM Systems Journal, vol. 41, No. 4, 2002, pp. 578-596.

Josifovski, V. et al, "Garlic: A New Flavor of Federated Query Processing for DB2", ACM SIGMOD '2002 Conference Proceedings, Jun. 4, 2002-Jun. 6, 2002, USA, pp. 524-532.

"IBM WebSphere Information Integrator: Accessing and integrating diverse data for the on demand business", IBM White Paper, Jan. 2005, USA, pp. 1-28.

Barbancon F. et al, "Implementing federated database systems by compiling SchemaSQL", Database Engineering and Applications Symposium, 2002, Proceedings. International Jul. 17-19, 2002, Piscataway, New Jersey, USA, IEEE, Jul. 17, 2002, pp. 192-201.

Roth, M.T. et al, "Don't Scrap It Wrap It, A Wrapper Architecture for Legacy Data Sources", Proceedings of the International Conference on Very Large Data Bases, Aug. 26, 1997, pp. 266-275.

Kozankiewicz, H. et al, "Implementation of Federated Databases Through Updatable Views", Advances in Grid Computing—EGC 2005, European Grid Conference, Springer Verlag, LNCS, vol. 3470, Feb. 14, 2005-Feb. 16, 2005, pp. 610-619, Germany.

International Search Report, International application No. PCT/EP2006/062310, Applicant's file reference SVL040086, Date of mailing of the international search report Aug. 1, 2006.

Written Opinion of the International Searching Authority, International application No. PCT/EP2006/062310, Applicant's file reference SVL040086, Date of mailing of the Written Opinion Aug. 1, 2006 <7 pages>.

International Preliminary Report on Patentability, International application No. PCT/EP2006/062310, Applicant's file reference SVL040086, Date of mailing of the International Preliminary Report on Patentability Apr. 23, 2007 <10 pages>.

Non-Final Office Action for U.S. Appl. No. 11/131,792 mailed on Aug. 21, 2007 <12 pages>.

Final Office Action for U.S. Appl. No. 11/131,792 mailed on Feb. 5, 2008 <19 pages>.

Notice of Allowance for U.S. Appl. No. 11/131,792 mailed on Jul. 31, 2008 <11 pages>.

* cited by examiner

COMMON INTERFACE TO ACCESS CATALOG INFORMATION FROM HETEROGENEOUS DATABASES

This application is a continuation of prior application Ser. No. 11/131,792, filed May 17, 2005. Application Ser. No. 11/131,792 is hereby incorporated by reference in its entirety.

BACKGROUND OF THE INVENTION 1.0 Field of the Invention

This invention relates to database management systems; and in particular, this invention relates to a common interface to access catalog information from heterogeneous databases.

2.0 Description of the Related Art

Database management systems allow large volumes of data to be stored and accessed efficiently and conveniently in a computer system. In a database management system, data is typically stored in database tables which organize the data into rows and columns. In a relational database management system, tables may be associated with each other. For example, the data in one column of a table may be used to refer to data in another table.

IBM® (Registered trademark of International Business Machines Corporation) Websphere® (Registered trademark of International Business Machines Corporation) Information Integrator, Standard edition, integrates diverse and distributed data sources in real time, regardless of where the data source resides. IBM Websphere Information Integrator, Standard edition is a federated relational database management system that allows data in relational and non-relational databases to be accessed using the Structured Query Language (SQL), and Open Database Connectivity (ODBC) and Java® (Registered trademark of Sun Microsystems, Inc.) Database Connectivity (JDBC) interfaces.

Database management systems typically store metadata which describes the data contained in the database in system catalog tables. This metadata comprises information such as schema names, table names, column names, column types and index definitions. Client applications, in addition to the database management system itself, may access this metadata. For example, data modeling tools, information asset management systems, data warehousing tools and reporting tools typically use a programming interface to retrieve a description of the data accessible from the database. One reporting tool programmatically interrogates the database to retrieve a list of tables that are available, as well as the column name and type information, to assist a user in order to dynamically build a SQL query. Each database vendor provides their own implementation of system catalog tables, typically with a proprietary naming scheme, format and available information.

Standards introduced by the American National Standards Institute (ANSI) Database Standards Committee and application programming interfaces (APIs) such as Open Database Connectivity and Java Database Connectivity provide well-defined interfaces to retrieve metadata information from the system catalogs. Application developers benefit from these standards and programming interfaces in order to build vendor-independent, portable database applications.

Enterprises today typically have multiple relational database products installed, and have multiple instances of a particular database product in their production environment. It is not unusual for larger information technology (IT) shops to have tens of thousands of databases from multiple vendors in use by production applications. For such complex environments, it is even more important to provide access to the metadata for each database. As the number and types of databases increases, it becomes increasingly difficult for the applications to provide consistent access to the metadata of all the database management systems. Retrieving metadata information across relational database management systems via a JDBC or ODBC interface is often a complex undertaking for an application because the application must manage a connection to each different source of data.

FIG. 1 depicts a block diagram of a conventional client application 10 which extracts and combines information from multiple source database management systems 12, 14 and 16, respectively. Each source database management system 12, 14 and 16, has a database, source database A 18, source database B 20 and source database C 22, respectively. Each source database 18, 20 and 22 also has associated source metadata, metadata A 24, metadata B 26 and metadata C 28, respectively. In this example, the metadata for each database has a different format. Each source database management system 12, 14 and 16 also has a different source metadata application programming interface (API) to access the source metadata, source metadata API A, 30, source metadata API B 32 and source metadata API C 34, respectively. For example, to access multiple database management systems 12, 14 and 16, the client application 10 loads a different driver for each of the database management systems 12, 14 and 16, maintains separate connections 36, 38 and 40 to each of the database management systems 12, 14 and 16, invokes the appropriate source metadata APIs 30, 32 and 34 to retrieve metadata information from each database management system, and interprets and combines the results 42, 44 and 46 from those source metadata APIs 30, 32 and 34 within the client application 10 itself. The source metadata APIs 30, 32 and 34 and the format of the result 42, 44 and 46 may differ between source database management systems, 12, 14 and 16, respectively.

FIG. 2 depicts a flowchart of a conventional technique which illustrates the complexity of retrieving metadata from different database management systems. Suppose the client application 10 wants to find all tables which contain a column whose name contains the pattern '%ID%' across the three heterogeneous source database management systems 12, 14 and 16 of FIG. 1, where "%" is a wildcard character which is considered to match any character(s). The first source database management system 12 supports JDBC as its source metadata API; the second source database management system 14 supports ODBC as its source metadata API; and in the third source database management system 16, SQL is used to directly query its system catalog tables as its source metadata API. As shown in the flowchart of FIG. 2, the client application 10 must manage various connection formats and results. The client application 10 must connect to each source database management system 12, 14 and 16 (FIG. 1), understand the source metadata API for that source database management system, and then consolidate separate data results from the three source database management systems.

In step 50, the client application 10 connects to source database management system A 12 (FIG. 1) which contains source database A 18 (FIG. 1). In step 52, the client application 10 invokes source metadata API A 30 (FIG. 1) to find the column names containing the desired pattern. In response, source database management system A 12 (FIG. 1) returns result A 42 which has the format of source database management system A 12 (FIG. 1). In step 54, the client application 10 connects to source database management system B 14 (FIG. 1) which contains source database B 20 (FIG. 1). In step 56, the client application 10 invokes source metadata API B 32 (FIG. 1) to find the column names containing the desired pattern. In response, source database management system B 14 (FIG. 1) returns result B 44 which has the format of source database management system B 14 (FIG. 1). In step 58, the client application 10 connects to source database management system C 16 (FIG. 1) which contains source database C 22 (FIG. 1). In step 60, the client application 10 invokes source metadata API C 34 (FIG. 1) to find the column names containing the desired pattern. In response, source database management system C 16 (FIG. 1) returns result C 46 which has the format of source database management system C 16 (FIG. 1). In step 62, the client application 10 unifies the results 42, 44 and 46.

The source metadata APIs are bound to a single database connection and require the client application 10 to connect to each database management system and to invoke the specific source metadata API call for each database management system, that is, source metadata API A, source metadata API B and source metadata API C.

Some enterprise metadata management tools require access to metadata across the databases of an enterprise. These tools typically rely on custom-built adapters to retrieve metadata from different data sources, including relational database management systems, and use those adapters to populate a separate metadata catalog store on another server. Such solutions have some disadvantages. First, developing and maintaining such custom adapters for each source supported by these products is costly. New adapters must be provided for each new data source, and adapters must be updated each time the underlying interface or format changes. Second, maintaining a separate metadata catalog store introduces significant overhead to store, index, and synchronize with the original data sources.

Therefore there is a need for an improved technique to access metadata in a heterogeneous database environment. This technique should provide a common interface for the client applications to access metadata from multiple database management systems. This technique should also avoid maintaining a separate metadata catalog store.

SUMMARY OF THE INVENTION

To overcome the limitations in the prior art described above, and to overcome other limitations that will become apparent upon reading and understanding the present specification, various embodiments of a system and computer program product are provided to access metadata from a plurality of data servers from a federated database management system. In one embodiment, an application request for metadata, from a client application, is received by the federated database management system. Data servers which are accessible from the federated database management system are identified. For each data server, metadata describing data of a data source of that data server is retrieved in accordance with the application request to produce retrieved metadata. The retrieved metadata from each data server is aggregated to produce an aggregated result in a uniform format. The aggregated result is provided.

In another embodiment, an application request for metadata, from a client application, is received by the federated database management system. Data servers which are accessible from the federated database management system are identified. For each data server, a source metadata request for metadata of that data server is generated in accordance with the application request and a source metadata application programming interface. A view is created based on the source metadata request for metadata for each data server.

In this way, an improved technique to access metadata in a heterogeneous environment has been provided.

BRIEF DESCRIPTION OF THE DRAWINGS

The teachings of the present invention can be readily understood by considering the following description in conjunction with the accompanying drawings, in which.

To facilitate understanding, identical reference numerals have been used, where possible, to designate identical elements that are common to some of the figures.

DETAILED DESCRIPTION

Figure 1:
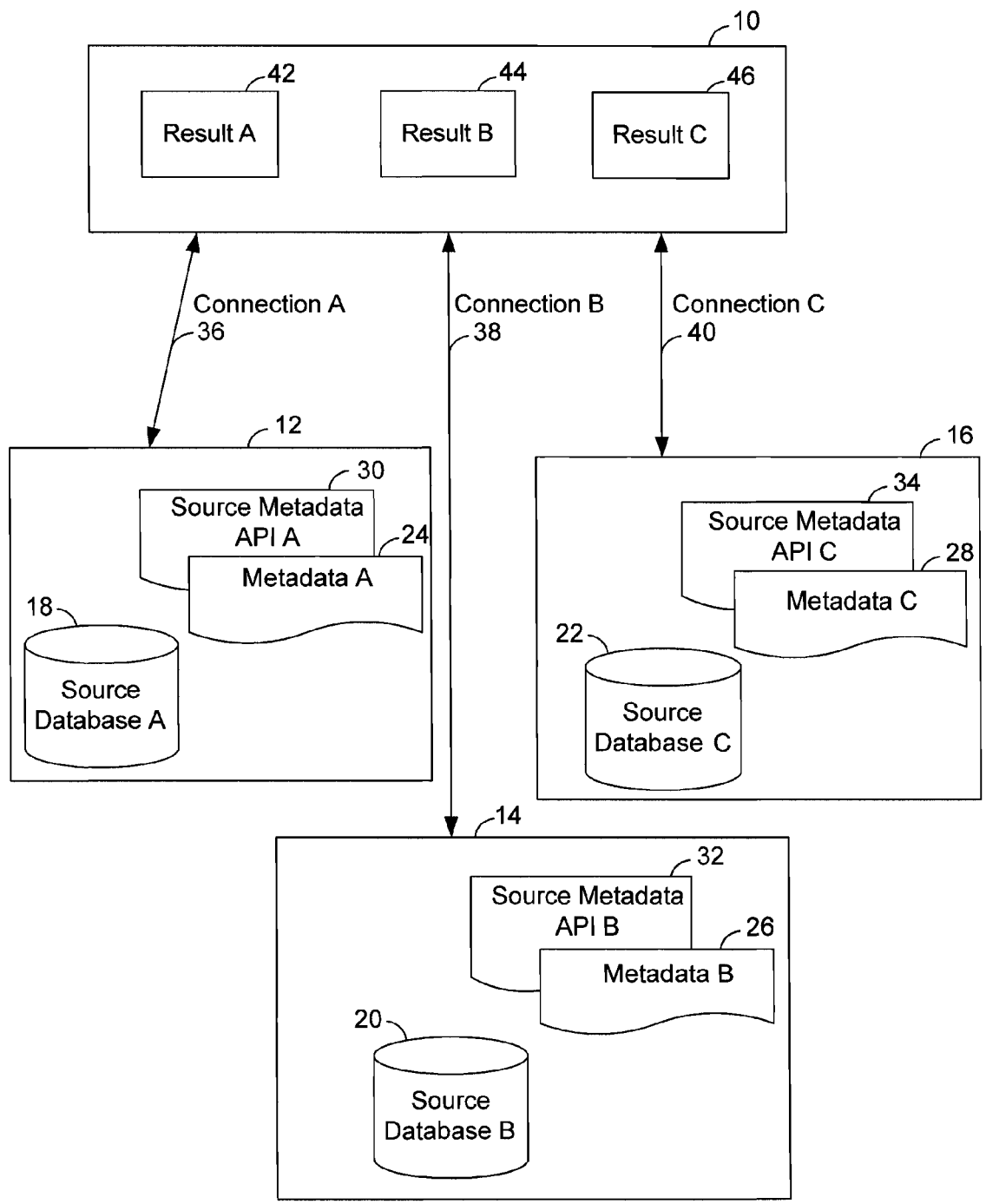
FIG. 1 depicts a block diagram of a conventional client application which extracts and combines information from multiple database management systems.
Figure 2:
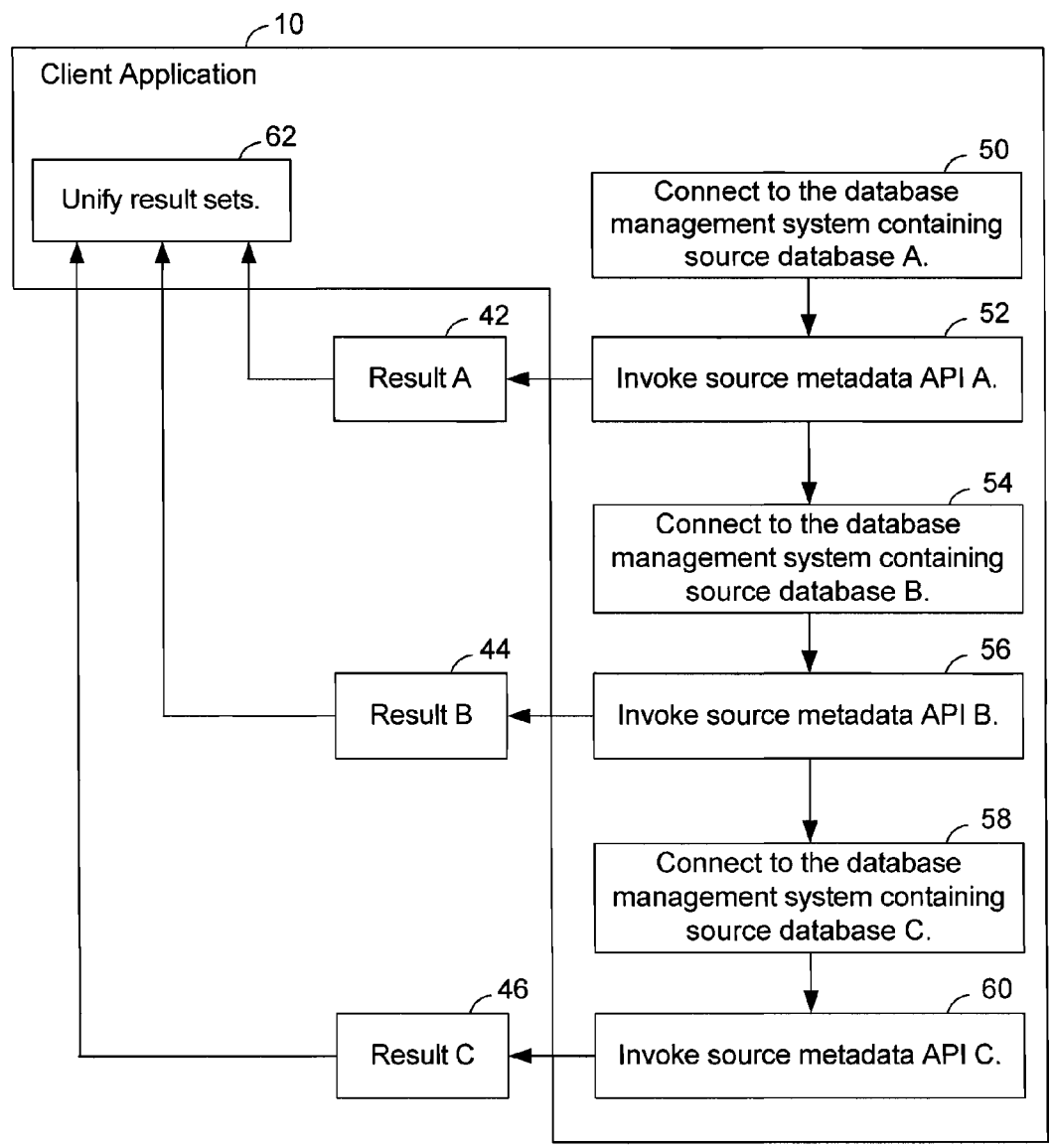
FIG. 2 depicts a flowchart of a conventional technique which illustrates the complexity of retrieving metadata from different database management systems.

After considering the following description, those skilled in the art will clearly realize that the teachings of the various embodiments of the present invention can be utilized to access metadata. Various embodiments of a method, system and article of manufacture are provided to access metadata from a plurality of data servers from a federated database management system. In one embodiment, an application request for metadata, from a client application, is received by the federated database management system. Data servers which are accessible from the federated database management system are identified. For each data server, metadata describing data of a data source of that data server is retrieved in accordance with the application request to produce retrieved metadata. The retrieved metadata from each data server is aggregated to produce an aggregated result in a uniform format. The aggregated result is provided.

In another embodiment, an application request for metadata, from a client application, is received by the federated database management system. Data servers which are accessible from the federated database management system are identified. For each data server, a source metadata request for metadata of that data server is generated in accordance with the application request and a source metadata application programming interface. A view is created based on the source metadata requests for metadata for each data server. In this embodiment, the client application accesses the metadata on the data servers using the view.

Various embodiments of providing a common interface to retrieve metadata from a plurality of heterogeneous data servers are described. A data server comprises at least one data source, and provides metadata describing the data of that data source, and that metadata is accessible to the federated database management system. In various embodiments, a data server is a database management system; in some embodiments, a data server comprises a file system; and in yet other embodiments, a data server comprises an application. The data servers may be from different vendors. In various embodiments, a data source may be a database, a spreadsheet or a flat file. A data server is associated with a source metadata API which is invoked to retrieve metadata from the data source. In various embodiments, the source metadata API can be at least one and any combination of the following APIs, such as JDBC, ODBC and a direct SQL query.

In various embodiments, the client application invokes the common interface API to retrieve metadata from a plurality of heterogeneous data servers. In these embodiments, the common interface API invokes the appropriate source metadata API for the data servers. Therefore, a client application establishes only a single connection to a federated database management system and uses the common interface API to retrieve metadata from multiple data servers. Using the common interface API, the metadata of the data servers appears to be stored in one consistent place and in one unified form. In various embodiments, the common interface API accesses the metadata in real-time, ensuring that the information in the metadata is up-to-date and accurate. Alternately, if latency can be tolerated, the common interface API caches the metadata at the federated database management system for a faster response to requests for the metadata. In various embodiments, the metadata comprises system catalog information. In some embodiments, the metadata comprises at least one schema name, one or more table names associated with each schema, the column names associated with the tables, and data type of the columns. In other embodiments, the metadata is not meant to be limited to schema names, table names, column names and data type of the columns, and the metadata may contain different information. In some embodiments, filter criteria is specified and passed to the data servers, thereby enabling the client application to control the amount of data returned. Furthermore, in various embodiments, multiple applications can use the common interface API to access the same metadata without having to reassemble that metadata themselves.

Figure 3:
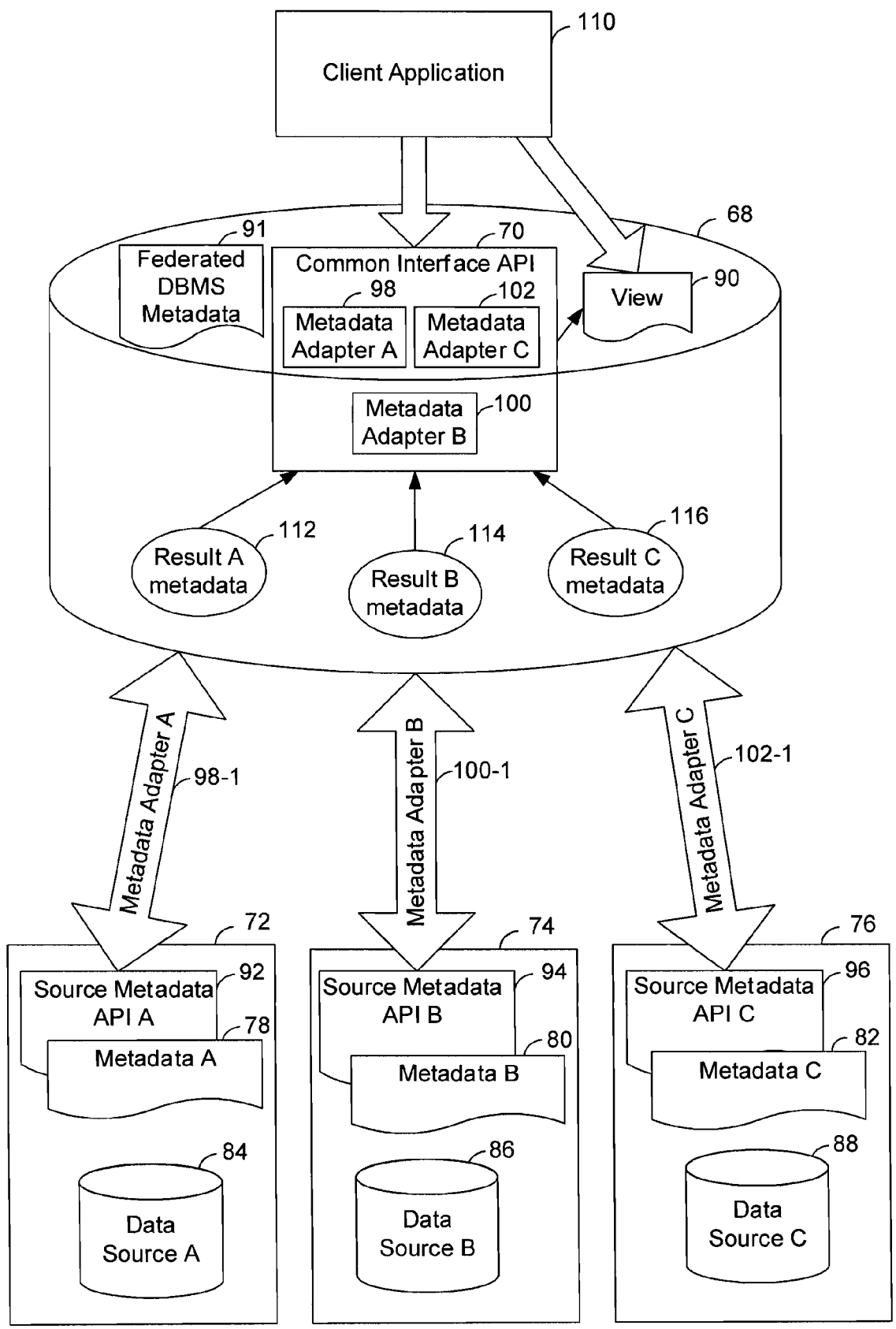
FIG. 3 depicts a diagram of a federated database management system and multiple heterogeneous data servers.

FIG. 3 depicts a diagram of a federated database management system 68 which has a common interface API 70 which can be used to access metadata from multiple data servers 72, 74 and 76. The data servers 72, 74 and 76 have metadata 78, 80 and 82, which describes the data contained in data sources 84, 86 and 88, respectively. In various embodiments, the common interface API 70 creates a view 90 of the metadata 78, 80 and 82 of the data servers, 72, 74 and 76, respectively, on the federated database management system 68. In some embodiments, the view is a database view object. The federated database management system 68 has its own federated database management system (DBMS) metadata 91, for example, a system catalog. In various embodiments, the common interface API 70 exploits federation technology to encapsulate information, such as the specific source metadata API calls and connections to the data servers, 72, 74 and 76, to extract metadata 78, 80 and 82, in real-time from the data servers, 72, 74 and 76, respectively. The common interface API 70 has a metadata adapter for each type of data server, in this example, metadata adapter A 98, metadata adapter B 100 and metadata adapter C 102 for data servers 72, 74 and 76, respectively. The data servers 72, 74 and 76 have source metadata APIs such as metadata API A 92, metadata API B 94 and metadata API C 96 to access the metadata, metadata A 78, metadata B 80 and metadata C 82, respectively. The source metadata APIs 92, 94 and 96 may be, for example, JDBC, ODBC or a SQL query. In various embodiments, as indicated by arrows 98-1, 100-1 and 102-1, the metadata adapters 98, 100 and 102 provide an interface between the federated database management system 68 and the metadata 78, 80 and 82 on the data servers, 72, 74 and 76, using the source metadata APIs, 92, 94 and 96, to access that metadata, 78, 80 and 82, respectively.

The metadata adapter 98, 100 and 102, is a software module which contains the connection information to a particular data server containing a particular data source as well as the logic to generate a query to that particular data source's metadata using the source metadata API for that data source. In some embodiments, the metadata adapter also invokes the generated query to the data source and maps the requested metadata from that data server to a result object. In various embodiments, the metadata adapter encapsulates knowledge of how to map the metadata format natively supported by a data server to the view, including performing data conversion, name conversion, joins, or other operations which transform the metadata of the heterogeneous data source into the format of the common interface API.

In some embodiments, the metadata adapter is implemented as a Java class. However, the metadata adapter is not meant to be limited to a Java class and other programming languages and techniques may be used.

In various embodiments, the common interface API 70 creates the view 90 of the metadata 78, 80 and 82, and the client application 110 accesses the metadata 78, 80 and 82, by issuing a query which specifies the view 90. In some embodiments, the metadata retrieved using the view 90 is associated with an identifier, such as the server name, which identifies the data server from which the metadata was retrieved. The view 90 provides the client application 110 with a common, consistent format for the metadata, that is, result A metadata 112, result B metadata 114 and result C metadata 116, retrieved from each of the data servers 72, 74 and 76, respectively.

In some embodiments, the common interface API 70 returns an aggregated result, for example a result object, comprising results A, B and C metadata, 112, 114 and 116, respectively, in a common format. In various embodiments, the result object contains metadata from the data servers, with an identifier which identifies the data server from which the metadata was retrieved.

Figure 4:
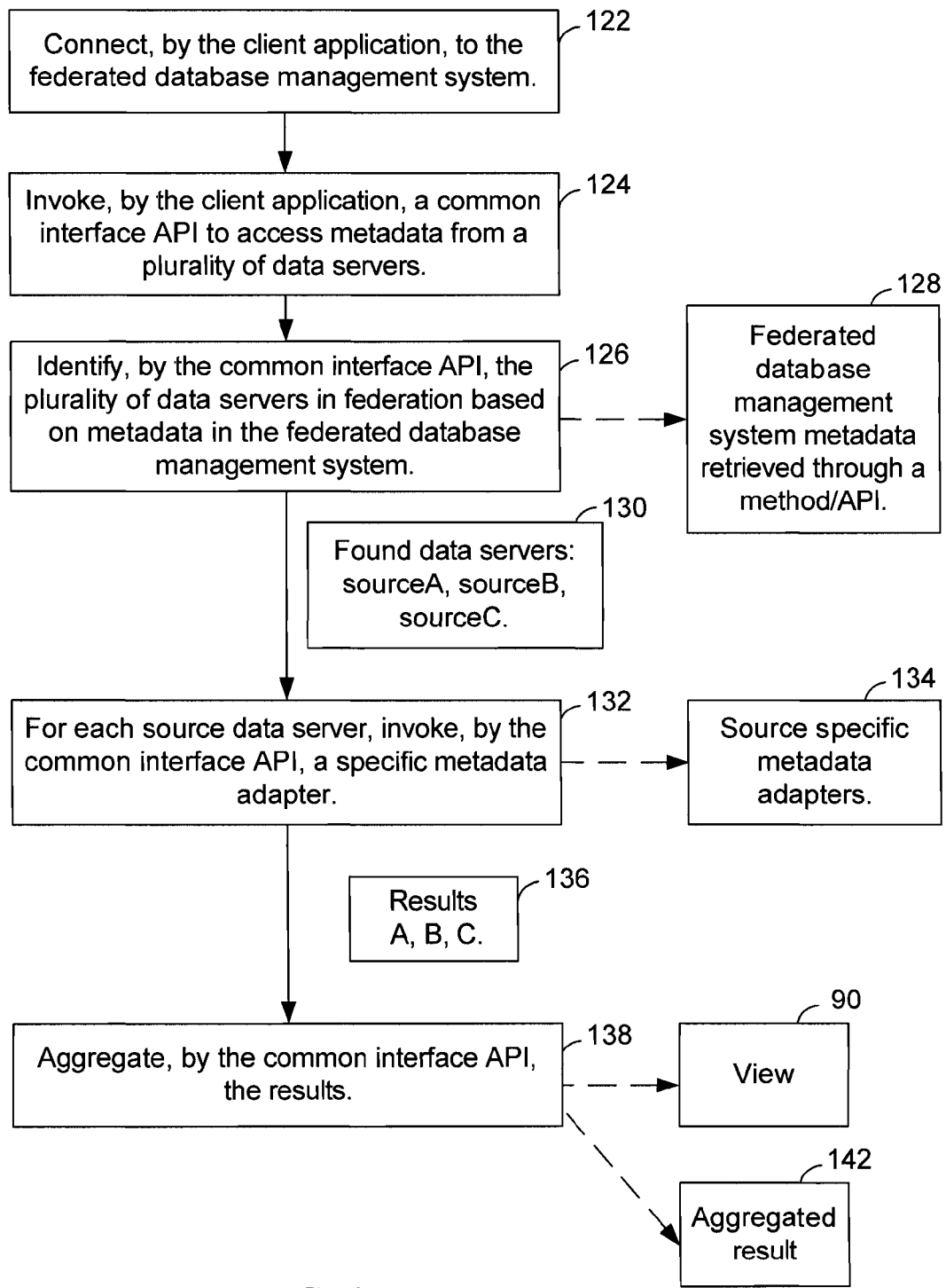
FIG. 4 depicts a flowchart of an embodiment of accessing metadata from the heterogeneous data servers of FIG. 3 using a common interface API.

FIG. 4 depicts a flowchart of an embodiment of accessing metadata from heterogeneous servers using the common interface API. In various embodiments, the flowchart of FIG. 4 is implemented in the federated database management system 68 of FIG. 3. The federated database management system 68 (FIG. 3) publishes federated database management system metadata 91 (FIG. 3) which describes the data sources of the data servers which are accessible through federation.

In step 122, the client application 110 (FIG. 3) connects to the federated database management system 68 (FIG. 3). In step 124, the client application invokes the common interface API of the federated database management system 68 (FIG. 3) to access metadata from a plurality of data servers. In step 126, the federated database management system identifies a plurality of data servers, as indicated by block 130, which are accessible to the federated database management system based on the federated database management system metadata 91 (FIG. 3). As part of step 126, as indicated by block 128, the federated database management system metadata 91 (FIG. 3) is retrieved through a method or API. In some embodiments, this method or API is part of the common interface API; in other embodiments, the federated database management system provides a method or API to retrieve the federated database management system metadata 91 (FIG. 3).

In step 132, for each data server, the common interface API invokes a specific metadata adapter which provides a result for each data server as shown by block 136. Each invoked metadata adapter generates a query to retrieve metadata from its associated data server. In some embodiments, the metadata adapter executes the query and returns a result containing metadata from the data server. In various embodiments, the metadata is from the system catalog of the data server. In some embodiments, if a particular data server is not available or if the client application does not have proper authorization for a data server, that data server can either be omitted from the result set, or an error can be returned, depending on client application preference.

In step 138, the common interface API aggregates the results into a single aggregated result 142, in some embodiments, a result object. The aggregated result contains metadata in a uniform format. In one embodiment, the aggregated result is provided to the client application 120.

Alternately, in step 132, the result from each metadata adapter comprises the query, for example, a SQL statement, to retrieve the metadata from the data server; and in step 138, the common interface API aggregates the results to create the view 90. Thus, the common interface API creates the view 90 based on the SQL statements. The client application issues a query using the view to retrieve the metadata from the data servers.

In some embodiments, the common interface API is implemented as one or more methods of a Java class; however, the common interface API is not meant to be limited to Java and other programming languages can be used.

In various embodiments, one or more common interface APIs provide metadata such as the server names, schema names, the table names and column names, with an identifier of the source of the metadata, in a result object. In some embodiments, the common interface APIs provide a result object of type ResultSet and comprise the following methods:
  ResultSet getservers( )
  ResultSet getschema (server name, server type, schema name)
  ResultSet getTables (server name, server type, schema name, table name, table type)
  ResultSet getColumns (server name, server type, schema name, table name, table type, column name, column type).

In some embodiments, one or more common interface APIs provide a view comprising metadata such as the schema names, table names and column names, and an identifier of the data source for that metadata. In some embodiments, the common interface APIs which provide a view comprise the following methods:
  void getSchemaView (server name, server type, schema name, view name)
  void getTablesView (server name, server type, schema name, table name, table type, view name)
  void getColumnsView (server name, server type, schema name, table name, table type, column name, column type, view name).

These methods are of type void and do not return a result object.

In other embodiments, when the view name is NULL, the metadata is provided in a result object rather than a view. In yet other embodiments, the common interface API has a view flag which a user can set to create a view, for example:
  ResultSet getSchemaView (server name, server type, schema name, view flag, view name).

In the above method, if a view is created, the result object will be empty.

The getServers( ) API returns information describing the data servers, such as the server name with the server type, which are accessible to the federated relational database management system. The getservers( ) API accesses the metadata 91 (FIG. 3) of the federated database management system which contains the information describing the data servers. In some embodiments, the result object returned by the getServers( ) API has three fields or columns of metadata comprising a server name, a server type and a server version. For example, if the database management system federates two DB2 database management systems with different names, an exemplary result object comprises two rows, and each row has the server name, the server type and server version as follows:
  "MyDB2-1" "DB2/UDB" "8.2"
  "MyDB2-2" "DB2/UDB" "8.2"

The getServers( ) API is not meant to be limited to DB2 database management systems and metadata describing other database management systems may be returned. In other embodiments, the result object uses a different format, such as comma separated fields.

The getSchema (server name, server type, schema name) API accesses the metadata of multiple data servers and returns a result object comprising schema names from the data server, and, in some embodiments, with the server name associated with the schema name. In some embodiments, the result object has four fields or columns of metadata comprising a server name, a server type, a server version and a schema name. The getSchema API has various parameters—the server name, the server type and schema name. In response to the parameters being NULL, the getSchema API returns the schema names of the data servers with, in some embodiments, the name of the associated data server containing that schema name. The server name, source type and schema name parameters can be used to filter which schema names are returned. The parameters may be used alone or in combination. For example, to retrieve the names of the schemas which contain the term "model," the schema name parameter is set to '%model%' and the other parameters are NULL. In some embodiments, additional filtering parameters may be added to the getSchema API.

The getTables (server name, server type, schema name, table name, table type) API accesses the metadata of multiple data servers and returns a result object comprising table names, and in some embodiments, the table type from the data servers. In some embodiments, the name of the data server associated with the table name is also returned. In various embodiments, the result object has six fields or columns of metadata comprising a server name, a server type, a server version, a schema name, table name and table type. The getTables API has various parameters—the server name, server type, schema name, table name and table type. In response to the parameters being NULL, the getTables API returns the table names of the data sources of the data servers. The parameters may be used alone or in combination to filter which table names are returned as described above with respect to the getschema API. In some embodiments, additional filtering parameters may be added to the getTables API, for example, to add a column name column so that the getTables API returns the table names of those tables containing a column with a particular column name.

The getColumns (server name, server type, schema name, table name, table type, column name, column type) API accesses the metadata associated with the data sources of the data servers and returns a result object comprising column names, and in some embodiments, their column types. In various embodiments, at least one or a combination of the table name and server name associated with the column name is returned. In some embodiments, the result object has twelve fields or columns of metadata comprising a server name, the server type, the server version, a schema name, a table name, a column name, the column data type, the column length, an indicator of whether the column is nullable, a default value, an indicator of whether the column is a primary key and an indicate or whether the column is a foreign key, where the column length has a type of integer, and the indicators of whether the column is a primary key or foreign key have a type of boolean. The getColumns API has various parameters—the server name, server type, schema name, table name, table type, column name and column type. In response to the parameters being NULL, the getColumns API returns the column names of the data sources. The parameters may be used alone or in combination to filter which table names are returned as described above with respect to the getSchema API. In some embodiments, additional parameters may be added to the getColumns API, for example, a primary key parameter, a foreign key parameter, a data type parameter, a column length parameter and whether a column is nullable.

In some embodiments, the getSchemaView (server name, server type, schema name, view name), getTablesView (server name, server type, schema name, table name, table type, view name) and getColumnsView (server name, server type, schema name, table name, table type, column name, column type, view name) APIs create a view on the federated database management system, rather than returning a result object. In these embodiments, a specified view name is added as a parameter. The parameters of getSchemaView, getTablesView and getColumnsView are the same as the parameters of getschema, getTables and getColumns except for the view name.

An example of flowchart of FIG. 4 will be described with respect to the getTables API. For example, suppose that the client application wants to find all tables whose name contains the pattern '%ID%' across N heterogeneous data servers. In this example, the heterogeneous data servers comprise the three data sources 84, 86 and 88 of FIG. 3.

In step 122, the client application connects to the federated database management system in a conventional manner. In step 124, the client application invokes the common interface API to access the metadata of the data servers of the federated database management system, for example, getTables (NULL, NULL, NULL, '%ID%', NULL). The federated database management system receives the common interface API from the client application.

In step 126, the common interface API, in this example, getTables, identifies one or more data servers in federation based on the federated database management system metadata 91 (FIG. 3). As indicated by block 128, the common interface API invokes a method or API which, in this example, is the getServers( ) API, to identify the names of the data servers. In this example, the names of the data servers are sourceA, sourceB and sourceC. Block 130 depicts the names of the data servers.

A metadata adapter is provided for each type of data server, as illustrated by block 134, and, in some embodiments, the metadata adapter is implemented as a Java class. SourceA is a type of server which is associated with the Java class MetadataAdapterA; sourceB is a type of server which is associated with the Java class MetadataAdapterB; and sourceC is a type of server which is associated with the Java class MetadataAdapterC.

In this example, in step 132, the getTables API creates an instance of a metadata adapter for each data server, sourceA, sourceB and sourceC, based on the associated Java class for that data server. For example, instances of a metadata adapter for sourceA, sourceB and sourceC are created as follows:
  adapterA=new MetadataAdapterA ( );
  adapterB=new MetadataAdapterB ( );
  adapterC=new MetadataAdapterC ( ).

Each class of a metadata adapter contains at least one method which implements the source metadata API to retrieve metadata from that data server. For example, the class for MetadataAdapterA contains a method which implements the source metadata API to retrieve metadata from sourceA. For example, the getTables API of the common interface API invokes a method of the metadata adapter, in this case the instance called adapterA, which generates a query to retrieve the requested metadata based on the source metadata API. In some embodiments, for example using IBM Websphere Information Integrator, a nickname is created on each source of metadata which will be accessed. In various embodiments, the nickname is created under a standard schema and standard naming scheme. For example, if the metadata is stored in a table on a data server, and the nickname associated with that table will be used to access the metadata. Therefore, using the nickname, a separate connection to the database management system containing the metadata is not created. In various embodiments, the metadata adapter creates nickname(s) on the remote table(s) containing the metadata if the nickname(s) does not already exist, thereby handling the connection to the remote table(s), and generates a SQL query based on the nickname(s).

In this example, sourceA is a DB2 data source, and the following exemplary SQL statement is generated in accordance with the source metadata API for sourceA as follows:
  SELECT tableName AS tablename, serverName FROM systablesNickname WHERE tab_name LIKE '%ID%' AND serverName='sourceA'

The exemplary SQL statement above returns the table names which contain the characters "ID" with the name of the server, in this example, "sourceA". In this example, the name of the system catalog table being queried is "systables" and the nickname which was created to access "systables" is "systablesNickname".

For sourceB, which is a different type of database management system from sourceA, an exemplary SQL statement may be generated in accordance with the source metadata API for sourceB as follows:
  SELECT tableName AS tablename, serverName FROM all_tablesNickname WHERE tab_name LIKE '%ID%' AND serverName='sourceB'

The exemplary SQL statement above returns the table names which contain the characters "ID" with the name of the server, in this example, "sourceB". In this example, the name of the system catalog table being queried is "all_tables" and the nickname which was created to access "all_tables" is "all_tablesNickname".

For sourceC, which is yet another different type of database management system from sourceA and sourceB, an exemplary SQL statement may be generated in accordance with the source metadata API for sourceC as follows:
  SELECT tableName AS tablename, serverName FROM systablesNickname WHERE tabname LIKE '%ID%' AND serverName='sourceC'

The exemplary SQL statement above returns the table names which contain the characters "ID" with the name of the server, in this example, "sourceC". In this example, the name of the system catalog table being queried is "systables" and the nickname which was created to access "systables" is "systablesNickname".

In various embodiments, the metadata adapters execute the SQL SELECT statements and return metadata in a result, called tableName (block 136), from the data server to the common interface API. In various embodiments, in step 138, the common interface API aggregates the metadata from each metadata adapter into a single aggregated result which is returned to the client application. An example of an aggregated result which has table names and server names is as follows:

| | |
|---|---|
| "EMPID" | "sourceA" |
| "ID_CARD_NO" | "sourceA" |
| "PROD_ID" | "sourceB" |
| "USERID" | "sourceC" |

In another embodiment in which the client application invokes the getTablesView API and specifies a view name, a view having the specified view name is created. In this embodiment, in step 132, the database queries, that is, the SQL statements, are not executed by the metadata adapters. The metadata adapters return the generated SQL statements to the common interface API. In step 138, the common interface API creates a view based on the returned SQL statements. For example, a SQL statement to create the view is generated as follows:
CREATE VIEW ViewName AS
SELECT tableName AS tablename, serverName FROM systablesNickname WHERE tab_name LIKE '%ID%' AND serverName='sourceA'
SELECT tableName AS tablename, serverName FROM all_tablesNickname WHERE tab_name LIKE '%ID%' AND serverName='sourceB'
SELECT table_Name AS tablename, serverName FROM systablesNickname WHERE tabname LIKE '%ID%' AND serverName='sourceC'.
The common interface API executes the SQL statement which creates the view, and the view is provided on the federated database management system. In this example, the view refers to the table names as "tablename."

Figure 5:
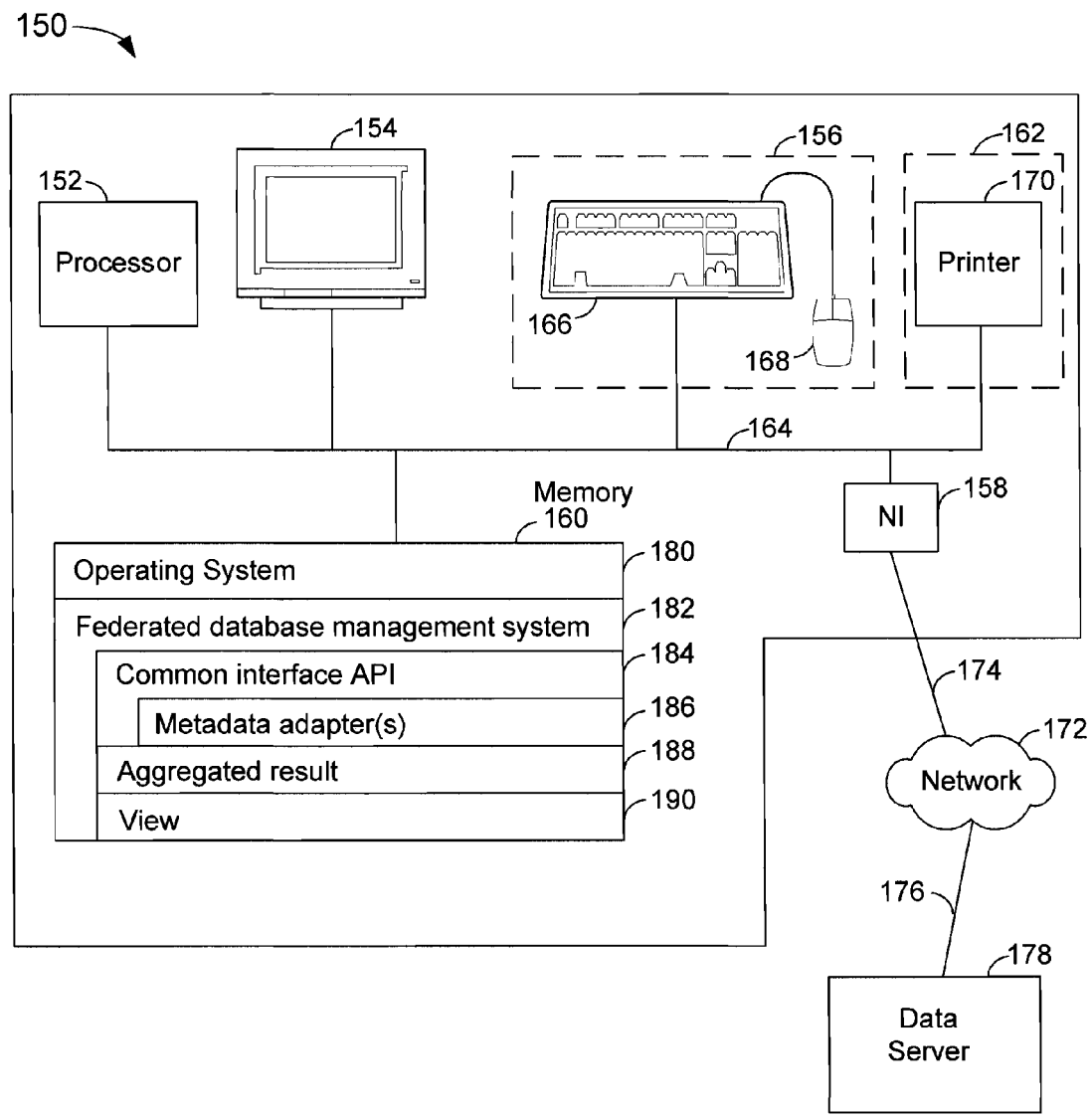
FIG. 5 depicts an illustrative computer system which uses various embodiments of the present invention.

For example, the client application retrieves the table names from the view as follows:
SELECT * FROM ViewName FIG. 5 depicts an illustrative computer system 150 which uses various embodiments of the present invention. The computer system 150 comprises a processor 152, display 154, input interfaces (I/F) 156, communications interface 158, memory 160 and output interface(s) 162, all conventionally coupled by one or more buses 164. The input interfaces 156 comprise a keyboard 166 and a mouse 168. The output interface 162 comprises a printer 170. The communications interface 158 is a network interface (NI) that allows the computer 150 to communicate via a network 172, such as the Internet. The communications interface 158 may be coupled to a transmission medium 174 such as a network transmission line, for example twisted pair, coaxial cable or fiber optic cable. In another embodiment, the communications interface 158 provides a wireless interface, that is, the communications interface 158 uses a wireless transmission medium. In some embodiments, the network 172 is connected, via another transmission medium 176, to one or more data servers 178.

The memory 160 generally comprises different modalities, illustratively semiconductor memory, such as random access memory (RAM), and disk drives. In various embodiments, the memory 160 stores an operating system 180 and a federated database management system 182. In various embodiments, the federated database management system 182 comprises the common interface API 184, one or more metadata adapters 186, an aggregated result 188 and a view 190.

In various embodiments, the specific software instructions, data structures and data that implement various embodiments of the present invention are typically incorporated in the federated database management system 182. Generally, an embodiment of the present invention is tangibly embodied in a computer-readable medium, for example, the memory 160 and is comprised of instructions which, when executed by the processor 152, causes the computer system 150 to utilize the present invention. The memory 160 may store the software instructions, data structures and data for any of the operating system 180 and the federated database management system 182, in semiconductor memory, in disk memory, or a combination thereof. Other computer memory devices presently known or that become known in the future, or combination thereof, may be used for memory 160.

The operating system 180 may be implemented by any conventional operating system such as z/OS® (Registered Trademark of International Business Machines Corporation), MVS® (Registered Trademark of International Business Machines Corporation), OS/390® (Registered Trademark of International Business Machines Corporation), AIX® (Registered Trademark of International Business Machines Corporation), UNIX® (UNIX is a registered trademark of the Open Group in the United States and other countries), WINDOWS® (Registered Trademark of Microsoft Corporation), LINUX® (Registered trademark of Linus Torvalds), Solaris® (Registered trademark of Sun Microsystems Inc.) and HP-UX® (Registered trademark of Hewlett-Packard Development Company, L.P.).

In various embodiments, the federated database management system 182 is the IBM Websphere Information Integrator. However, the invention is not meant to be limited to the IBM Websphere Information Integrator and other federated database management systems may be used.

In various embodiments, the present invention may be implemented as a method, system, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier or media. In addition, the software in which various embodiments are implemented may be accessible through the transmission medium, for example, from a server over the network. The article of manufacture in which the code is implemented also encompasses transmission media, such as the network transmission line and wireless transmission media. Thus the article of manufacture also comprises the medium in which the code is embedded. Those skilled in the art will recognize that many modifications may be made to this configuration without departing from the scope of the present invention.

The exemplary computer system illustrated in FIG. 5 is not intended to limit the present invention. Other alternative hardware environments may be used without departing from the scope of the present invention.

The foregoing detailed description of various embodiments of the invention has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended thereto.

What is claimed is:

1. A computer program product for accessing metadata from a plurality of data servers accessible from a federated database management system, the computer program product comprising:

a computer readable medium, wherein said computer readable medium is tangible;

first program instructions to receive, from a client application, a first application request for metadata by said federated database management system, wherein said first application request for metadata requests at least one table name of at least one database table accessible from said federated database management system;

second program instructions to identify a plurality of data servers accessible from said federated database management system, said plurality of data servers comprising a first data server and a second data server, said first data server being a first relational database management system, said second data server being a second relational database management system, said first relational database management system comprising at least one first database table, said second relational database management system comprising at least one second database table;

third program instructions to, for said each data server of said plurality of data servers, retrieve first metadata in accordance with said first application request to produce retrieved first metadata, said retrieved first metadata for said first data server comprising at least one first table name of said at least one first database table, respectively, of said first relational database management system, and said retrieved first metadata for said second data server comprising at least one second table name of said at least one second database table, respectively, of said second relational database management system, wherein a metadata adapter for said each data server generates a source metadata request to retrieve said first metadata based on a first application request and a source metadata application programming interface associated with said each data server, and said metadata adapter for said each data server invokes said source metadata request;

fourth program instructions to aggregate said retrieved first metadata from said each data server to produce a first aggregated result, said first aggregated result comprising said at least one first table name and a name of said first data server, and also comprising said at least one second table name and a name of said second data server in a first uniform format; and fifth program instructions to provide said first aggregated result;

wherein said first, second, third, fourth and fifth program instructions are stored on said computer readable medium.

2. The computer program product of claim 1 wherein said plurality of data servers are heterogeneous.

3. The computer program product of claim 1 wherein said third program instructions to retrieve said first metadata invokes said metadata adapter for said each data server to retrieve said first metadata.

4. The computer program product of claim 1 wherein said source metadata request is implemented using at least one of a SQL statement, Java Database Connectivity Interface or Object Database Connectivity Interface.

5. The computer program product of claim 1 wherein said first application request comprises a filter to filter said metadata in accordance with a specified pattern, wherein said third program instructions retrieve said at least one first table name and said at least one second table name from said first and second data servers, respectively, in accordance with said filter.

6. The computer program product of claim 1 wherein said first relational database management system and said second relational database management system have different source metadata application programming interfaces.

7. The computer program product of claim 1 wherein said at least one first table name is retrieved from said first data server using a SQL statement and said at least one second table name is retrieved from said second data server using a Java Database Connectivity Interface.

8. The computer program product of claim 1 wherein at least one third table name is retrieved from a third data server of said plurality of data servers using an Object Database Connectivity Interface.

9. A system for accessing metadata from a plurality of data servers accessible from a federated database management system, comprising:

a processor; and a memory storing a plurality of instructions executable by said processor, said plurality of instructions comprising instructions for:

receiving, from a client application, a first application request for metadata by said federated database management system, wherein said first application request for metadata requests at least one table name of at least one database table accessible from said federated database management system;

identifying a plurality of data servers accessible from said federated database management system, said plurality of data servers comprising a first data server and a second data server, said first data server being a first relational database management system, said second data server being a second relational database management system, said first relational database management system comprising at least one first database table, said second relational database management system comprising at least one second database table;

for said each data server of said plurality of data servers, retrieving first metadata in accordance with said first application request to produce retrieved first metadata, said retrieved first metadata for said first data server comprising at least one first table name of said at least one first database table, respectively, of said first relational database management system, and said retrieved first metadata for said second data server comprising at least one second table name of said at least one second database table, respectively, of said second relational database management system, wherein a metadata adapter for said each data server generates a source metadata request to retrieve said first metadata based on a first application request and a source metadata application programming interface associated with said each data server, and said metadata adapter for said each data server invokes said source metadata request;

aggregating said retrieved first metadata from said each data server to produce a first aggregated result, said first aggregated result comprising said at least one first table name and a name of said first data server, and also comprising said at least one second table name and a name of said second data server in a first uniform format; and providing said first aggregated result.

10. The system of claim 9 wherein said plurality of data servers are heterogeneous.

11. The system of claim 9 wherein said retrieving comprises invoking said metadata adapter for said each data server to retrieve said first metadata.

12. The system of claim 9 wherein said source metadata request is implemented using at least one of a SQL statement, Java Database Connectivity Interface or Object Database Connectivity Interface.

13. The system of claim 9, said plurality of instructions comprising instructions for:
receiving, from said client application, a second application request for metadata, wherein said second application request requests names of columns of tables accessible from said federated database management system;
for said each data server of said plurality of data servers, retrieving second metadata comprising at least one column name of at least one column of said at least one database table of said each data server to produce retrieved second metadata, said retrieved second metadata for said first data server comprising at least one first column name of said at least one first database table and said at least one first table name of said first relational database management system, and said retrieved second metadata for said second data server comprising at least one second column name of said at least one second database table and said at least one second table name of said second relational database management system;
aggregating said retrieved second metadata from said each data server to produce a second aggregated result, said second aggregated result comprising said at least one first table name, said at least one first column name, and said name of said first data server, and said at least one second table name, said at least one second column name, and said name of said second data server in a second uniform format; and
providing said second aggregated result.

14. The system of claim 9 wherein said first application request comprises a filter to filter said metadata in accordance with a specified pattern, wherein said retrieving retrieves said at least one first table name and said at least one second table name from said first and second data servers, respectively, in accordance with said filter.

15. The system of claim 13 wherein said retrieving said second metadata retrieves at least one data type of said at least one first column associated with said at least one first column name, respectively, for said first data server; and retrieves at least one data type of said at least one second column associated with said at least one second column name, respectively, for said second data server;
wherein said aggregating said retrieved second metadata from said each data server produces said second aggregated result comprising said at least one first column name, and said at least one data type of said at least one first column associated with said at least one first column name, respectively, said at least one first table name, and said name of said first data server, and said at least one second column name, said at least one data type of said at least one second column associated with said at least one second column name, respectively, said at least one second table name and said name of said second data server in said second uniform format.

16. The system of claim 15 wherein said retrieving said second metadata retrieves at least one indicator of whether said at least one first column associated with said at least one first column name is a primary key, respectively, for said first data server; and retrieves at least one indicator of whether said at least one second column associated with said at least one second column name is a primary key, respectively, for said second data server; and
wherein said aggregating said retrieved second metadata from said each data server produces said second aggregated result comprising said at least one first table name, said at least one first column name, said at least one data type of said at least one first column associated with said at least one first column name, and said at least one indicator of whether said at least one first column associated with said at least one first column name is a primary key, respectively, of said at least one first database table of said first data server, said at least one second table name, said at least one second column name, said at least one data type of said at least one second column associated with said at least one second column name, said at least one indicator of whether said at least one second column associated with said at least one second column name is a primary key, respectively, of said at least one second database table of said second data server in said second uniform format.

17. The system of claim 15 wherein said retrieving said second metadata retrieves at least one indicator of whether said at least one first column associated with said at least one first column name is a foreign key, respectively, for said first data server; and retrieves at least one indicator of whether said at least one second column associated with said at least one second column name is a foreign key, respectively, for said second data server; and
wherein said aggregating said retrieved second metadata from said each data server produces said second aggregated result comprising said at least one first table name, said at least one first column name, said at least one data type of said at least one first column associated with said at least one first column name, and said at least one indicator of whether said at least one first column associated with said at least one first column name is a foreign key, respectively, of said at least one first database table of said first data server, and said at least one second table name, said at least one second column name, said at least one data type of said at least one second column associated with said at least one second column name, and said at least one indicator of whether said at least one second column associated with said at least one second column name is a foreign key respectively, of said at least one second database table of said second data server in said second uniform format.

18. The system of claim 15 wherein said retrieving said second metadata retrieves at least one first column length of said at least one first column associated with said at least one first column name, respectively, for said first data server; and retrieves at least one second column length of said at least one second column associated with said at least one second column name, respectively, for said second data server; and
wherein said aggregating said retrieved second metadata from said each data server produces said second aggregated result comprising said at least one first table name, said at least one first column name, said at least one data type of said at least one first column associated with said at least one first column name, and said at least one first column length of said at least one first column associated with said at least one first column name, respectively, of said at least one first database table of said first data server, and said at least one second table name, said at least one second column name, said at least one data type of said at least one second column associated with said at least one second column name, and said at least one second column length of at least one second column associated with said at least one second column name, respectively, of said at least one second database table in said second uniform format.

19. The system of claim 9 wherein said first relational database management system and said second relational database management system have different source metadata application programming interfaces.

20. The system of claim 9 wherein said at least one first table name is retrieved from said first data server using a SQL statement and said at least one second table name is retrieved from said second data server using a Java Database Connectivity Interface.

21. The system of claim 9 wherein at least one third table name is retrieved from a third data server of said plurality of data servers using an Object Database Connectivity Interface.

22. A computer program product for accessing metadata from a plurality of data servers accessible from a federated database management system, comprising:
a computer readable medium, wherein said computer readable medium is tangible;
first program instructions to receive, from a client application, an application request for metadata by said federated database management system, wherein said application request for said metadata requests at least one table name of at least one table accessible from said federated database management system;
second program instructions to identify a plurality of data servers accessible from said federated database management system, said plurality of data servers comprising a first data server and a second data server, said first data server being a first relational database management system, said second data server being a second relational database management system, said first relational database management system comprising at least one first database table that stores first data, said second relational database management system comprising at least one second database table that stores second data;
third program instructions to, for said each data server of said plurality of data servers, retrieve metadata comprising at least one table name of at least one table of said each data server in accordance with said application request to produce retrieved metadata, at least one first table name of said at least one first database table, respectively, being retrieved from said first relational database management system, at least one second table name of said at least one second database table, respectively, being retrieved from said second relational database management system, wherein a metadata adapter for said each data server generates a source metadata request to retrieve said metadata comprising said at least one table name of said at least one table of said each data server based on said application request and a source metadata application programming interface associated with said each data server, and said metadata adapter for said each data server invokes said source metadata request; and
fourth program instructions to create a view comprising said retrieved metadata from said each data server, said view comprising said at least one first table name, a name of said first data server, said at least one second table name, and a name of said second data server in a uniform format;
wherein said first, second, third and fourth program instructions are stored on said computer readable medium.

23. The computer program product of claim 22 further comprising:
fifth program instructions to receive a query specifying said view; and
sixth program instruction to, in response to said query, provide metadata from said view;
wherein said fifth and sixth program instructions are stored on said computer readable medium.

24. A system for accessing metadata from a plurality of data servers accessible from a federated database management system, comprising:
a processor; and
a memory storing a plurality of instructions executable by said processor, said plurality of instructions comprising instructions for:
receiving, from a client application, an application request for metadata by said federated database management system, wherein said application request for said metadata requests at least one table name of at least one table accessible from said federated database management system;
identifying a plurality of data servers accessible from said federated database management system, said plurality of data servers comprising a first data server and a second data server, said first data server being a first relational database management system, said second data server being a second relational database management system, said first relational database management system comprising at least one first database table that stores first data, said second relational database management system comprising at least one second database table that stores second data;
for said each data server of said plurality of data servers, retrieving metadata comprising at least one table name of at least one table of said each data server in accordance with said application request to produce retrieved metadata, at least one first table name of said at least one first database table, respectively, being retrieved from said first relational database management system, at least one second table name of said at least one second database table, respectively, being retrieved from said second relational database management system, wherein a metadata adapter for said each data server generates a source metadata request to retrieve said metadata comprising said at least one table name of said at least one table of said each data server based on said application request and a source metadata application programming interface associated with said each data server, and said metadata adapter for said each data server invokes said metadata request; and
creating a view comprising said retrieved metadata from said each data server, said view comprising said at least one first table name, a name of said first data server, said at least one second table name, and a name of said second data server in a uniform format.

25. The system of claim 24 said plurality of instructions comprising instructions for:
receiving a query specifying said view; and
in response to said query, providing metadata from said view.

26. An apparatus for accessing metadata from a plurality of data servers accessible from a federated database management system, comprising:
means for receiving, from a client application, a first application request for metadata by said federated database management system, wherein said first application request for metadata requests at least one table name of at least one database table accessible from said federated database management system;

means for identifying a plurality of data servers accessible from said federated database management system, said plurality of data servers comprising a first data server and a second data server, said first data server being a first relational database management system, said second data server being a second relational database management system, said first relational database management system comprising at least one first database table, said second relational database management system comprising at least one second database table;

means for, for said each data server of said plurality of data servers, retrieving first metadata in accordance with said first application request to produce retrieved first metadata, said retrieved first metadata for said first data server comprising at least one first table name of said at least one first database table, respectively, of said first relational database management system, and said retrieved first metadata for said second data server comprising at least one second table name of said at least one second database table, respectively, of said second relational database management system, wherein a metadata adapter for said each data server generates a source metadata request to retrieve said first metadata based on a first application request and a source metadata application programming interface associated with said each data server, and said metadata adapter for said each data server invokes said source metadata request;

means for aggregating said retrieved first metadata from said each data server to produce a first aggregated result, said first aggregated result comprising said at least one first table name and a name of said first data server, and also comprising said at least one second table name and a name of said second data server in a first uniform format; and means for providing said first aggregated result.

* * * * *